United States Patent Office 3,025,327
Patented Mar. 13, 1962

3,025,327
MERCAPTO-7,3a,4,7,7a-PENTAHYDRO-4,7-
METHANOINDENES
Paul D. May, Galveston, and Robert J. Lee, La Marque,
Tex., assignors, by mesne assignments, to Standard
Oil Company, Chicago, Ill., a corporation of Indiana
No Drawing. Filed Mar. 30, 1959, Ser. No. 802,607
1 Claim. (Cl. 260—609)

Our invention relates to mercaptans. More particularly, it relates to a novel composition of matter which is a mercaptan derivative possessing outstanding utility as a modifier in the preparation of synthetic rubbers.

We have discovered that a novel unsaturated mercaptan is obtained by adding hydrogen sulfide to dicyclopentadiene in the presence of water, a peroxide, and either metallic iron, cobalt, or nickel. The inventive compound is prepared by a reaction depicted below:

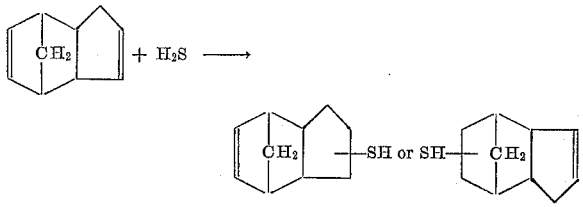

where one of the alternate products is obtained. Present analytical methods are unable to definitively characterize the structure of the resultant material, but it is known to be an x-mercapto-y-3a,4,7,7a-pentahydro-4,7-methanoindene having, in its pure form, a boiling point of about 85° C. at 3 millimeters mercury, containing about 18.8–19.2 wt. percent sulfur, with a molecular weight of about 166–168, a density (25/4° C.) of about 1.085 and a refractive index (25/D) of about 1.5505. It is a water-white liquid. The inventive compound is of exceptional value as a chain transfer agent or modifier in the polymerization of olefinic materials to synthetic rubbers.

In the preparation of the new compound, a molar excess of $H_2S$ is reacted with dicyclopentadiene in the presence of water, a peroxide such as di-tert-butyl peroxide, and a metal such as iron, cobalt or nickel. It appears that any peroxide capable of initiating free radicals may be used, or alternatively any equivalent material such as ultra-violet light or $\alpha,\alpha'$-azodi-iso-butyronitrile may be substituted for peroxide. The metal is advantageous in finely divided form, such as iron filings, commercial steel wool, or nickel-on-kieselguhr. The reaction is preferably conducted at elevated temperatures and pressures, optimally at a temperature within the range of about 200–500° F. and a pressure of from about 500 to about 200 p.s.i.g. when a peroxide is employed. The peroxide and the metal may be used in a concentration of about 0.001 to about 10 wt. percent or more on dicyclopentadiene. The reaction time appears to depend upon the temperature, pressure, and activity of the peroxide; a reaction time within the range of about one to about thirty hours or more may be employed.

We have found that the new compound is an excellent chain transfer agent or modifier for the preparation of synthetic rubber by polymerizing suitable precursors of such rubber. For example, in the emulsion co-polymerization of butadiene with styrene, the inventive compound gives an homogenous polymer when used in a concentration ranging from about 0.05 to about 0.8 part per one-hundred parts of monomer mixture. In an illustrative embodiment, 71.5 parts by weight of butadiene and 28.5 parts of styrene are co-polymerized in the presence of 180 parts of water, 4.68 parts of "Dresinate" emulsifier (Hercules Powder Company, rosin soap), and 0.30 part of potassium persulfate. The co-polymerization is conducted in the presence of 0.05–0.8 part of the x-mercapto-y-3a,4,7,7a-pentahydro-4,7-methanoindene for about fifteen hours at about 50° C. About 72% of the monomer is converted to a polymer having a Mooney rubber viscosity of about 55.

The following example illustrates the preparation and characterization of the new mercaptan compound.

*Example*

A mixture of 399 grams of hydrogen sulfide, 396 grams of dicyclopentadiene, 50 grams water, and 3 grams di-tert-butyl peroxide was charged to a carbon steel reactor containing 12.5 grams of steel wool and reacted at 1,000 p.s.i.g., and 250° F. The mixture was maintained at these conditions for ten hours after which the products, consisting of an aqueous layer and a non-aqueous liquid layer were withdrawn. The non-aqueous layer was distilled at 3 millimeters mercury pressure absolute in a 15-plate column. A water-white liquid boiling at 85° C. (3 millimeters mercury) was obtained in a yield of 150 grams. It contained 18.8 wt. percent sulfur, all of which was mercaptan sulfur (calculated 19.2%); had a molecular weight of 168 (calculated 166); had a density (25/4D) of 1.085; and a refractive index (25/D) of 1.5505. It was an x-mercapto-y-3a,4,7,7a-pentahydro-4,7-methanoindene.

In addition to its use as a synthetic rubber modifier, the new mercaptan compound may be used as an antioxidant in stereospecific homopolymers and co-polymers of 1-alkenes or dienes such as polyethylene, polypropylene, poly-cis-butadiene, etc., particularly when these polymers contain a minor amount of finely dispersed carbon black as an ultraviolet light stabilizing agent. Also, by reason of their unsaturated function, the new compounds may be chlorinated to compounds useful as herbicides and insecticides.

The method of preparing mercaptans of this general type is described in application S.N. 802,649 by F. A. Ford, filed March 30, 1959.

We claim:
An x-mercapto-7-3a,4,7,7a-pentahydro-4,7-methanoindene having one of the following structures

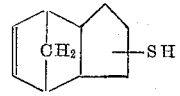

and

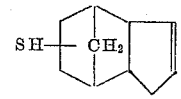

and having, in its pure form, a boiling point of about 85° C. at 3 millimeters mercury pressure absolute, a sulfur content of about 18.8–19.2 weight percent, a molecular weight of about 166–168, a density (25/4) of about 1.085, and a refractive index (25/D) of about 1.5505.

References Cited in the file of this patent
UNITED STATES PATENTS

| | | |
|---|---|---|
| 2,402,586 | Alvarado | June 25, 1946 |
| 2,469,017 | Sundet | May 3, 1949 |
| 2,522,512 | Harman et al. | Sept. 19, 1950 |
| 2,547,894 | Snyder et al. | Nov. 13, 1951 |